United States Patent Office 2,907,636

Patented Oct. 6, 1959

2,907,636

PREPARATION OF SULFUR (VI) FLUORIDE AND OXYFLUORIDES

William Channing Smith, Wilmington, Del., assignor to E. I. du Pont de Nemours and Company, Wilmington, Del., a corporation of Delaware No Drawing. Application June 7, 1957 Serial No. 664,164

7 Claims. (Cl. 23—203)

This invention relates to a new method for preparing inorganic compounds which contain hexavalent sulfur and fluorine.

Compounds which contain hexavalent sulfur and fluorine include sulfuryl fluoride ($SO_2F_2$), thionyl tetrafluoride ($SOF_4$) and sulfur hexafluoride ($SF_6$). Fluorides and oxyfluorides of sulfur are generally useful in the preparation of fluorocarbons as described in U.S. Patents 2,709,186 and 2,722,559. Sulfur hexafluoride, because of outstanding electrical properties, is of commercial significance as a gaseous dielectric. Sulfuryl fluoride has shown utility as a structural space fumigant [Stewart, J. Econ. Entomol. 50, 7–11 (1957)]. Thionyl tetrafluoride can be used as an intermediate in the preparation of fluorosulfonates by hydrolysis in water.

Fluorides which contain hexavalent sulfur have been prepared heretofore by processes which require the use of elemental fluorine. Variations have also been tried in which active inorganic fluorides, for example silver difluoride or cobalt trifluoride, have been substituted for elemental fluorine. Electrolytic processes which require anhydrous hydrogen fluoride have been suggested. Thionyl tetrafluoride has been obtained by reacting thionyl fluoride with fluorine over a platinum or silver fluoride catalyst. These processes possess obvious disadvantages in view of the well known toxic and corrosive characteristics of highly reactive fluorine gas or hydrogen fluoride, the difficulty of obtaining active inorganic fluorides and the formation of highly complex mixtures which are difficult to separate.

In accordance with the invention, fluorides and oxyfluorides of sulfur in which the sulfur is hexavalent can be prepared by contacting sulfur tetrafluoride with an inorganic compound which contains nitrogen and oxygen and in which the nitrogen is bonded solely to oxygen.

The nitrogen compounds most useful in the process contain nitrogen and oxygen with the nitrogen bonded solely to oxygen, and remaining element present in the compound being a metal. The division of elements into metals and non-metals is well recognized in modern chemistry. It is discussed, for example, in Deming's "General Chemistry" (John Wiley and Sons, Inc., 5 ed., chapter 11) and in Morgan and Burstall's "Inorganic Chemistry—A Survey of Modern Developments" (W. Heffer and Sons, Ltd. pp. 18–19). The metals, according to the periodic table in Deming's "General Chemistry," are the elements of groups I, II, VIII, III–B, IV–B, V–B, VI–B, VII–B, and the elements of groups III–A, IV–A, V–A, and VI–A which have atomic numbers above 5, 14, 33, and 52, respectively.

Sulfur tetrafluoride can be prepared by methods described in the literature (Brown and Robinson, J. Chem. Soc. 1955, 3147–51).

The hexavalent sulfur compounds obtained by the process of the invention are sulfur hexafluoride, thionyl tetrafluoride and sulfuryl fluoride. There may also be obtained, as a by-product, thionyl fluoride ($SOF_2$).

In the operation of the process, the oxides of nitrogen, because of availability and ease of reaction, form one preferred group of reactants. The nitrates and nitrites of alkali and alkaline earth metals, which are also readily available, form another preferred group of reactants.

In a modification of the process of the invention oxygen can be used in combination with the nitrogen reactant to otbain improved yields of the hexavalent fluorides of sulfur. This embodiment permits the use of lower quantities of the nitrogen reactant.

The reaction of the nitrogen compound with sulfur tetrafluoride is conducted under substantially anhydrous conditions in either a batch or continual flow process. In either process the reaction chamber is preferably made of material resistant to chemical attack by hydrogen fluoride, for example, stainless steel or platinum.

In a batch process, a vessel capable of withstanding pressure is preferably flushed with an inert gas, for example, nitrogen, to displace the air and is then charged with the nitrogen compound, if the latter is a solid. If the nitrogen compound is a gas or a volatile liquid the chamber is preferably cooled, evacuated to less than 50 mm. pressure and charged with the nitrogen compound. Sulfur tetrafluoride is then added to the cooled chamber. The reaction vessel is closed and heated to the desired temperature.

The proportions in which the reactants are used is not critical and is determined to some extent by the products which it is desired to obtain. For maximum yield of sulfur hexafluoride, the sulfur tetrafluoride reactant is preferably used in excess. For maximum yield of sulfur oxyfluorides, the nitrogen containing reactant is preferably used in excess. The molar ratio of sulfur tetrafluoride to the nitrogen containing reactant will also be determined in part by the number of oxygen atoms in the nitrogen compound that are available for converting the sulfur tetrafluoride to a hexavalent sulfur fluoride. Generally, sufficient nitrogen containing reactant is used to provide at least one-half atomic equivalent of oxygen for each mole of sulfur tetrafluoride. However, the quantity of said reactant used can vary so as to supply from as low as 0.1 to more than 20 atomic equivalents of oxygen for each mole of sulfur tetrafluoride.

In the modification of the process in which the nitrogen reactant is used in admixture with oxygen, the ratio of nitrogen reactant to oxygen is not critical and may vary over a wide range. The amount of free oxygen which can be used in admixture with the nitrogen compound can range from as low as 0.1 to greater than 20 atomic equivalents for each mole of sulfur tetrafluoride to be contacted. Applicant does not wish to be bound by any particular theory of operation but it is believed that the lower oxides of nitrogen which are present or formed during the operation of the process combine with the oxygen to form higher oxides of nitrogen which then react with sulfur tetrafluoride.

The temperature of the reaction is kept as low as operability permits. The reactants can be contacted at a temperature of 0° C. or lower or as high as 500° C. or higher. When the reactants are contacted initially at low temperatures it is generally desirable to raise the temperature toward the end of the reaction to obtain the maximum yield of fluorides and oxyfluorides of sulfur. The preferred temperature range for the reaction lies between about 100° C. and about 500° C. The higher temperature range is employed when a maximum yield of sulfur hexafluoride is desired.

The pressure employed in a batch process is generally autogenous, and usually lies between about 5 atmospheres and 150 atmospheres. Higher pressures can be employed.

The reaction time for a batch process can range from 2 hours or less to 48 hours or more. During the reaction period the contents of the reaction vessel are preferably mixed, for example, by mechanical stirring or shaking. In a continuous flow process the time of contact between the reactants may be as short as a few seconds.

The process of the invention can be conducted as a continuous flow process wherein the nitrogen containing reactant, if a solid, is placed in a tube of corrosion-resistant material and sulfur tetrafluoride passed over the nitrogen compound at a temperature sufficiently high to effect reaction. If the nitrogen compound is gaseous, it is passed together with the sulfur tetrafluoride into the tube which is heated to a temperature sufficient to effect reaction. The volatile products of the reaction are collected by well known methods, for example, by condensation in a series of traps cooled with solid carbon dioxide-acetone mixture and with liquid nitrogen or they can be collected in a chilled pressure vessel.

When an oxide of nitrogen is used as the reactant, there can be obtained as by-products elemental nitrogen or a lower oxide of nitrogen, that is, an oxide containing less oxygen than the original nitrogen reactant. When nitrates or nitrates are employed, metal fluorides are obtained as by-products in addition to elemental nitrogen and lower oxides of nitrogen.

The volatile hexavalent fluorides and oxyfluorides obtained in the process can be collected in traps or cylinders cooled as described above and then purified by known procedures, for example, fractional distillation under pressure. There may also be obtained in the operation of the process an intermediate solid reaction product from which oxyfluorides of sulfur are released by warming. If desired, the crude reaction product can be recycled with additional sulfur tetrafluoride to obtain higher yields of sulfur hexafluoride.

The following examples illustrate the process of the invention.

*Example I*

A pressure vessel of 80 ml. capacity and lined with stainless steel, was flushed with nitrogen, cooled in a solid carbon dioxide-acetone solution and evacuated to approximately 1 mm. pressure. It was then charged with 3 g. (0.10 mole) of nitric oxide (NO) and 22 g. (0.20 mole) of sulfur tetrafluoride. The vessel and contents were heated with agitation for 4 hours at 80° C., 4 hours at 140° C. and 6 hours at 200° C. After cooling the pressure vessel was opened and the volatile products, which weighted 24.5 g., were transferred to an evacuated stainless steel cylinder which was cooled in liquid nitrogen. The volatile products were shown by mass spectrometric analysis to contain 1.5–3.5% of thionyl tetrafluoride ($SOF_4$).

*Example II*

A. Using the pressure vessel and process described in Example I a mixture of 4.6 g. (0.1 mole) of nitrogen dioxide ($NO_2$) and 44 g. (0.40 mole) of sulfur tetrafluoride was heated at 200° C. for 2 hours, 250° C. for 2 hours, and 300° C. for 8 hours. There was obtained 38.0 g. of volatile products which were transferred to a cylinder cooled in liquid nitrogen. Mass spectrometric analysis of the volatile product in the liquid phase showed that it contained 7 mole percent of thionyl tetrafluoride ($SOF_4$), 5 mole percent of sulfur hexafluoride ($SF_6$), 2 mole percent of sulfuryl fluoride ($SO_2F_2$) and 44 mole percent of elemental nitrogen. The yield, therefore, of thionyl tetrafluoride was 19%; of sulfur hexafluoride, 14%. Conversion, based on amount of nitrogen dioxide consumed was over 95%.

B. A pressure vessel of 400 ml. capacity and lined with stainless steel, was evacuated to approximately 1 mm. pressure, and charged with 4.5 g. (0.10 mole) of nitrogen dioxide. The vessel was cooled to about −78° C. and charged with 54 g. (0.50 mole) of sulfur tetrafluoride and 4.11 g. of oxygen. The vessel was closed and heated at 200° C. for a period of 6 hours. During this period, oxygen was added to the bomb as needed to maintain the pressure at about 900 pounds. The vessel was then heated to 250° C. for about 5 hours and oxygen added to obtain a maximum pressure of 2000 pounds. A total of 28.3 g. of oxygen was added to the vessel during the experiment. The vessel was cooled to about 25° C. and the volatile products vented into a trap cooled with a solid carbon dioxide-acetone mixture. The material in the trap was principally liquid with a small amount of solid. The trap was cooled in liquid nitrogen, evacuated and the liquid transferred to an evacuated cylinder which was also cooled in liquid nitrogen. The liquid weighed 32 g. Mass spectrometric analysis of the liquid phase showed that it contained 57–74 mole percent of thionyl tetrafluoride, 4.6 mole percent of sulfuryl fluoride, 8–11 mole percent of thionyl fluoride, 8–11 mole percent of nitric oxide (NO) and a small amount of nitrogen dioxide ($NO_2$). No unreacted sulfur tetrafluoride was noted.

The solid remaining in the trap weighed 3 g. and was transferred by warming and volatilizing to a second cylinder. Mass spectrometric analysis of the vapor phase showed that it consisted of 31–41 mole percent of nitrogen dioxide, 18–20 mole percent of nitric oxide with minor amounts of thionyl tetrafluoride and sulfuryl fluoride.

Examples I and II illustrate the application of oxides of nitrogen in the process. Part B of Example II shows that the presence of oxygen during the reaction results in improved yields of fluorides of hexavalent sulfur. Other oxides of nitrogen which can be used are $N_2O_3$, $N_2O_4$, and $N_2O_5$. The oxides can be used in pure form or in mixtures, for example, a mixture of NO and $NO_2$ can be used in the process described in Examples I and II.

*Example III*

A pressure vessel of 145 ml. capacity and lined with stainless steel was charged by the process described in Example I with a mixture of 13.8 g. (0.20 mole) of sodium nitrite ($NaNO_2$) and 82.5 g. (0.76 mole) of sulfur tetrafluoride. It was heated with agitation at 200° C. for 2 hours, 250° C. for 2 hours, and 300° C. for 8 hours. The volatile products, weighing 85.0 g. were transferred to an evacuated stainless steel cylinder which was cooled in liquid nitrogen. Mass spectrometric analysis of the volatile product in the liquid phase showed that it contained 10 mole percent of sulfur hexafluoride ($SF_6$), 3.5 mole percent of thionyl tetrafluoride ($SOF_4$), 49 mole percent of thionyl fluoride and 31 mole percent of unreacted sulfur tetrafluoride. The yield of sulfur hexafluoride, therefore, was 42%; of thionyl tetrafluoride, 8%.

*Example IV*

Using a pressure vessel and process similar to that described in Example III, a mixture of 8.5 g. (0.10 mole) of sodium nitrate and 52 g. (0.48 mole) of sulfur tetrafluoride was heated with agitation for 2 hours at 200° C., 2 hours at 250° C., and 8 hours at 300° C. There was obtained 55 g. of volatile reaction products which were transferred to an evacuated stainless steel cylinder which had previously been cooled in liquid nitrogen. Mass spectrometric analysis of the product in the liquid phase showed that it contained 5.2 mole percent of sulfur hexafluoride, 27–32 mole percent of thionyl tetrafluoride, 27–29 mole percent of thionyl fluoride, 35–36 mole percent of unreacted sulfur tetrafluoride, and 2.5 mole percent of nitrogen. On the basis of these data, the yield of thionyl tetrafluoride was 57%, the yield of sulfur hexafluoride was 20%.

Examples III and IV illustrate the operation of the process as applied to ternary compounds which contain oxygen, nitrogen and a metal and in which the nitrogen is bonded solely to oxygen. Other compounds which can be used are potassium nitrite, calcium nitrite, magnesium nitrite, potassium nitrate, calcium nitrate, barium nitrate, copper nitrate, cobalt nitrate, chromium nitrate, ferric nitrate, and bismuth nitrate. The nitrates and nitrites can be used in pure form or in physical mixtures. Naturally occurring nitrates such as saltpeter can be used in the process.

*Example V*

Using a pressure vessel and process similar to that described in Example III, a mixture of 28.3 g. of sodium nitrate (0.33 mole) and 108 g. (1.00 mole) of sulfur tetrafluoride was heated without agitation at 200° C. for about 19 hours. The volatile products in the pressure vessel were vented into a trap cooled in a carbon dioxide-acetone mixture. A solid and a liquid were present in the trap which was then cooled in liquid nitrogen and evacuated.

The liquid portion of the condensate was transferred to a second evacuated cylinder cooled in liquid nitrogen by allowing the trap to warm up slowly until no liquid was visible. The weight of liquid obtained was 91 g. Mass spectrometric analysis of the liquid phase of the material in the cylinder showed that it contained 1.4 mole percent of sulfur hexafluoride, 11–12 mole percent of thionyl tetrafluoride, 43–48 mole percent of thionyl fluoride and 33–36 mole percent of unreacted sulfur tetrafluoride. There was also present smaller amounts of sulfuryl fluoride, nitric oxide and nitrogen.

The solid portion of the condensate collected in the trap was worked up as follows: The trap containing the solid, cooled to −78° C., was connected to a second trap which was cooled in a solid carbon dioxide-acetone mixture. The 2-trap system was then evacuated to about 1 mm. The trap containing the solid was allowed to warm to about 25° C. and then was warmed further with tepid water. Essentially all of the solid in the trap was volatilized and passed over into the second trap where it formed a mixture of liquid and solid. The trap was cooled in liquid nitrogen, evacuated and connected to a steel cylinder which was also cooled in liquid nitrogen. On allowing the trap to warm up slowly, the liquid was transferred to the steel cylinder and a pale yellow solid remained in the trap. The material in the cylinder, which weighed 31 g., was shown by mass spectrometric analysis of the liquid phase to contain 60–66 mole percent of thionyl tetrafluoride, 1.7 mole percent of sulfuryl fluoride, 2.2 mole percent of thionyl fluoride, and 0.3 mole percent of sulfur tetrafluoride.

The pale yellow solid which was left in the trap and which weighed about 5 g. volatilized on standing at room temperature. Fumes of nitrogen dioxide formed when the volatilization products came in contact with the atmosphere.

Example V illustrates the process of the invention in which an intermediate solid reaction product is formed from which the oxyfluorides of sulfur can be obtained by warming.

I claim:

1. A process comprising reacting sulfur tetrafluoride under substantially anhydrous conditions with an inorganic compound having nitrogen bonded solely to oxygen, any remaining element present in the compound being a metal, and thereby producing at least one member of the group consisting of the fluoride and oxyfluorides of hexavalent sulfur.

2. The process of claim 1 wherein the nitrogen containing reactant is used in admixture with free oxygen.

3. The process wherein an oxide of nitrogen is reacted under substantially anhydrous conditions with sulfur tetrafluoride and at least one member of the group consisting of the fluoride and the oxyfluorides of hexavalent sulfur is produced.

4. The process wherein sulfur tetrafluoride is reacted under substantially anhydrous conditions with a member of the group consisting of metal nitrates and nitrites and at least one member of the group consisting of the fluoride and the oxyfluorides of hexavalent sulfur is produced.

5. The process of contacting sulfur tetrafluoride under substantially anhydrous conditions and at reaction temperature with an inorganic compound which contains nitrogen and oxygen with the nitrogen bonded solely to oxygen and thereby producing at least one member of the group consisting of the fluoride and the oxyfluorides of hexavalent sulfur.

6. The process of claim 5 wherein the amount of inorganic compound to be contacted with the sulfur tetrafluoride contains at least one atomic equivalent of oxygen for each mole of sulfur tetrafluoride.

7. The process of claim 5 which is carried out at temperatures ranging from about 100° C. to 500° C.

References Cited in the file of this patent

Friend: "Textbook of Inorganic Chemistry," 1931, vol. VII, part II, page 85.